# United States Patent Office 3,361,363
Patented Jan. 2, 1968

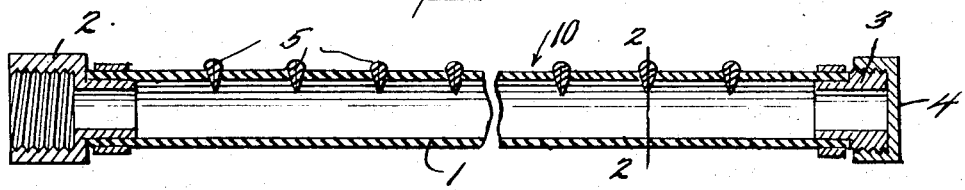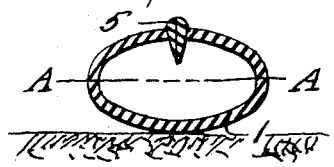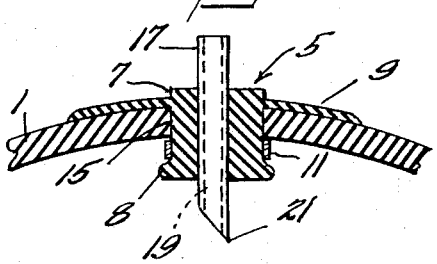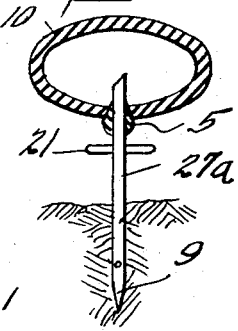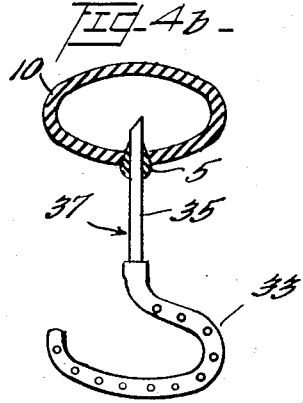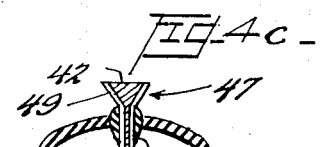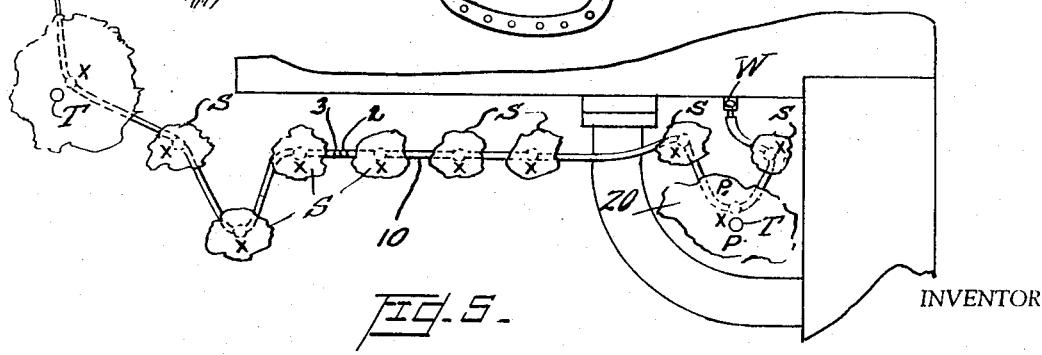

3,361,363
WATERING DEVICE
Robert S. Babington, 1113 Ingleside Ave.,
McLean, Va. 22101
Filed Oct. 22, 1965, Ser. No. 501,345
12 Claims. (Cl. 239—267)

ABSTRACT OF THE DISCLOSURE

The subject matter of concern herein is that of a garden and lawn watering device having self-sealing valves at regularly spaced intervals throughout its length and valve operating devices which are insertable into the valves and have exposed ends of varied configurations adapting them to the discharge of water for various types of applications, i.e., root feeding, soaking, area spraying and the like.

---

This invention is related to a new type of flexible garden hose for watering trees, shrubs, and lawns.

As is well known the beneficial effects of a good rainfall are difficult to duplicate by artificial means, particularly as regards the quantity of water that is required. In order to simulate the effects of even a light rainfall, artificial watering devices must be operated for long periods of time, and constantly moved from one garden spot to another. More often than not, due to the nature of the watering device, this operation is characterized by an appreciable waste of water due to surface runoff and the unavoidable watering of sidewalks, streets, and garden service areas. It follows then that an ideal watering device is one which is suited to a wide variety of applications, makes maximum use of the water available, and minimizes water waste and the time required to perform the watering operation.

The present invention then is directed to a novel watering device which more closely fulfills the ideal requirements than those presently in use, namely the area sprinkler which may be of the rotating or oscillating type; the soaker hose which provides slow surface watering; and the root feeder which provides sub-surface watering. The present invention is also a substantial improvement over devices such as those shown in U.S. Patents 2,716,574; and 2,563,300, among others, and provides a conveniently used all purpose watering device for use in apt horticultural or agricultural practices.

The current watering devices contain many inherent disadvantages which the present invention overcomes. For example both the area sprinkler and the soaker hose are effective as lawn sprinklers but are inefficient when used to water individual trees and/or shrubs. In this capacity both devices sprinkle a more general area than is necessary and this results in a waste of water. In the watering of trees and shrubs it is necessary to water only the earth that contains the root spread of the plant. The root feeder serves this purpose but since it is usually limited to watering only one shrub at a time its use is time consuming.

Preferably, though not necessarily the device comprises a hose of elliptical cross-section provided with at least one or more self-closing valves and a fitting, said fitting comprising, broadly, a valve operator provided with a discharge portion which discharge portion may be defined by a spray nozzle, a root feeding device, a pin point surface watering device or any other form of fluid applicator suitable to produce the desired pattern of water emission from the hose.

Accordingly, an object of the invention, therefore is to provide a watering device promoting maximum utilization of water by facilitating pin point watering.

Another object of the invention is to provide a watering device which can be used separately or concurrently as a pin point surface waterer, and/or sub-surface root feeder, and/or an area sprinkler.

Another object of the invention is to provide a watering device including a number of self closing, water take-off valves, herein called "water take-off ports," one or more of which may be used at any given time to accomplish specific watering tasks.

A further object of the invention is to provide a watering device with means for accommodating fertilizer to be dissolved upstream of the "water take-off ports" and distributed through one or more "take-off ports" simultaneously.

Still another object of the invention is to provide a watering device which can be used for a variety of watering applications, yet wherein the integrity of the device as a conventional garden hose is unaffected.

The above objects and numerous objects of the invention not specifically referred to, though inherent therein and apparent to those skilled in the art, may be accomplished by the combination of a flexible hose of a rubber fabric or plastic material, said hose including a multiplicity of spaced, self closing "water take-off ports," and a water-emitting fitting inserted in at least one of said ports whereby said port is opened permitting egress of water through the discharge portion of the fitting.

Having thus described the invention in its broad sense, a practical and useful structural arrangement thereof will become readily apparent from an inspection of the drawings, in connection with the following detailed description and wherein, in the drawings:

FIG. 1 is a side elevational view of a form of the invention with the several "take-off ports" being shown diagrammatically.

FIG. 2 is a cross-sectional view taken along the line 2—2 of FIG. 1 and showing the preferred configuration of the hose.

FIG. 3 is an enlarged view showing at least one type of self-closing valve and operator usable in the invention.

FIGS. 4, a, b, and c show modifications of the configuration given to the water-emitting portion of various fittings or valve operators.

FIG. 5 illustrates a general application of the apparatus comprising the invention.

Turning now to FIG. 1, the body 1 of hose 10 may be fabricated of the usual plastic or rubber-plastic fabric combinations presently and conventionally used in the manufacture of garden hose.

One end 2 of the body 1 of the hose 10 is provided with the usual female threaded coupling part 2, while the opposite end is provided with the usual male threaded coupling part 3, both as purely conventional in the art. Where only one section 10 of hose is used, the end 3 may be closed by a plastic or metal cap 4 while the female coupling part 2 is attached to a faucet. Where a plurality of sections 10 are used the end 2 of each section is coupled to the end 3 of an immediately preceding section; cap 4 being removed and applied to the end of the last of the successive hose sections 10, as will be readily understood.

Also provided as shown, in generally outline form in FIG. 1, in the body 1 of the hose section 10 are a plurality of water "take-off ports" 5, spaced along the length of body 1 and suitably affixed thereto in a permanent relationship. These "take-off ports" 5 may be evenly spaced at regular intervals throughout the length of section 10 at any convenient distance as may prove economical and practical to achieve the desired results.

FIG. 2, illustrates the preferred cross-sectional shape of the hose body 1, same being elliptical so that when laid out the hose will tend to be on the ground with the major axis A—A of the ellipse parallel thereto.

Turning now to FIG. 3, a very simple "take-off port" structure 5 and operator are disclosed, it being appreciated that a number of valve and valve operator arrangements other than that disclosed can be used. For example the so called football type valve and operator is completely adaptable to the use described herein. In this instance and for illustration purposes, the valve body is shown as comprising a cylinder 7 having a slightly enlarged end 3 and a wide annular flange 9 closely adjacent its opposite end. Surrounding the cylinder 7, intermediate its ends, but more closely adjacent end 8 is a spring of any suitable form, preferably a flat annular spring 11 formed of rust resistant material or the like. The cylinder 7 which is formed of a very resilient rubber material, or its equivalent is pierced axially of its length. Because of its inherent resiliency the axial passage is effectively closed throughout the length of the cylinder 7, the spring 8 acting where needed and used to generate a further circumferential inward closing force interiorly of the body 1 of the hose. The large flange 9 is in engagement with body 1 when the valve is inserted into aperture 15 provided in hose 1 and may be permanently fixed thereto as by adhesive bonding, vulcanizing or the like. As is believed apparent the valve members 5 are preferably installed at the time of manufacture by simply providing apertures 15 throughout the length of the hose section 10, and by thereafter inserting and fixing the valve means 7 into the apertures 15 prior to sale to the ultimate user. In some cases it might be desirable to supply the user with additional valves 7 which he can install per the usual practices for special work applications. Generally, however, the valves will be manufactured in place in the complete structure so that the spacing between and the number of valves will provide utmost convenience of use, for example, a thirty-foot hose section would be provided with twenty-eight such valves equally spaced from each other and from the respective ends 2 and 3 thereof a distance of one foot each.

Any suitable valve operator is provided in order to obtain access to the interior of the hose. As shown in FIG. 3, the operator 17 may comprise a hollow needle having an interior port 19 and a pointed end 21. The pointed end facilitates insertion of the operator through cylinder 7 where it is securely held in place by the pressure of both the cylinder 7 and spring 11 which develop considerable frictional resistance against removal of the operator 17. This resistance while of a magnitude sufficient to hold the operator 17 in place within cylinder 7 during use at normal pressures, nonetheless is not so great as to prohibit easy manual withdrawal of the operator 17 when desired.

Turning now to FIGS. 4 and 5 the operation of and several forms of the valve operator as a complete watering fitting will be described in detail, though it should be noted that the fitting 17 of FIG. 3 comprises the so-called "standard fitting" referred to hereafter.

The operation of the present invention is simple, as illustrated in FIG. 5. FIGURE 5 shows a plan view of the front foundation planting of a typical home. The grouping consists of eight shrubs S and two shade trees T. In watering this grouping of plants, hose 10 is connected to water spigot W by means of female hose fitting 2. The hose preferably hose sections 10 joined end to end where length is important, is then snaked in and around the plants as shown in the drawing. For an ideal surface watering a slow flow of water should be created at the ten locations marked X. This is accomplished by inserting a so-called "standard" fitting FIG. 3, into each of the ten "water take-off ports" closest to the X locations. If the "water take-off ports" are evenly spaced at one foot intervals along the hose, the largest discrepancy between any location X and the nearest fitting 17 would be six inches. The watering operation is started by turning on the water at spigot W and regulating the total flow to obtain the desired flow from each of the ten fittings located at the base of the plants.

It should be noted that in this operation there is no waste of water in and around the shrubs, or on the walkway, or driveway, particularly where, as it is in many cases, the homeowner provides a circular well around trees and shrubs to catch rainwater and reduce surface runoff. However, where no well is provided around shade trees T, surface water runoff would probably be experienced around the trees during the watering operation just described. To prevent this occurrence the two fittings located at the base of trees T could be replaced with sub-surface fitting 27 shown in FIGURE 4a. Fitting 27 is equipped with a sharp point 9 and a permanent or removable handle 21 so that it can be easily pushed into the soil to any desired depth at precisely the same surface location X. The nearest "water take-off port" 5, is then pressed onto fittings 27 so that water can be injected directly into the root zone of the tree.

FIGURE 4b shows a permanent sub-surface watering fitting 37 that could be installed at the time a shrub or tree is planted. The operation of this fitting is essentially the same as that just described for fitting 27 except that fitting 37 is designed to provide a more even distribution of water to the root zone of the plant. At the time the shrub is planted, flexible end 33 which is perforated with small holes is curled around the root ball of the plant and covered over with soil during the normal planting operation. Fitting 37 would then remain in the ground permanently with but an inch or two of its top protruding from the ground. When not in use the top of fitting 37 could be covered with simple plastic cap of the "press on" variety.

The individual cost of fitting 37 would be negligible in relation to the cost of the tree or shrub, and in the event of deterioration, it could be abandoned with no detrimental effect on the growth of the plant. The diameter of the shank portion 35 of fitting 37 would in all probability be greater than that of fitting 27 to accommodate a greater flow of water to the multiplicity of holes in end 33 of said permanently installed fitting.

Fitting 47 is made up of wedge-shaped plug 42 surrounded by flared out housing 49 to form a spray head at the discharge end of the fitting. In lieu of this design, fitting 47 could be made up of a simple perforated cap or any other suitable spray head mounted on the end of a cylindrical tube. Naturally, fitting 47 would be for area type sprinkling. For example, if the planting area 20 of FIGURE 5 which is defined by the boundaries of the house, walkway, and driveway, was underplanted with smaller shrubs, flowers, or ground cover, the entire area 20 would be sprinkled by making the following adjustments in the hose configuration. The "standard" fittings at the base of the two shrubs and the shade tree would be readjusted slightly and fittings 47 inserted in one or two locations, as for example, at locations P, to provide a spray pattern over the entire area 20. The value of a flat hose or one with an elliptical cross section can be appreciated when considering the spray head installations. In order to operate satisfactorily, the spray heads must be maintained in a position somewhat close to the vertical, and this is easiest to accomplish with a flat hose that will not roll over.

From the foregoing discussion it should be apparent that the present invention can accomplish three different types of watering operations at the same time. Referring again to FIGURE 5, it can be seen that area sprinkling could be provided in the area 20; pinpoint surface watering could be provided to the remaining shrubs across the front of the house; and sub-surface watering could be provided to the shade tree on the left side of the house.

Thus far the application of the present invention has been described only in terms of its use as a watering device. However, with the addition of a simple attachment upstream of "water take-off ports" 5, the present invention could be used to provide simultaneous watering and fertilizing during any of the watering operations thus far described. However, it is anticipated that the fertilization feature would be used primarily in conjunction with sub-surface watering configurations rather than for surface watering.

The fertilization would be accomplished by providing a mixing container supplied with dissolvable fertilizer upstream of "water take-off ports" 5. This container might be manufactured integral with hose fitting 2 or as a separate unit that it attached to hose fitting 2 or any other convenient location when in use. In either case it would be a mixing container characterized by the fact that spigot water would pass through said container before it is discharged through "water take-off ports" 5. The water passing through the mixing container would dissolve the fertilizer contained therein and fill the hose with a fertilized water solution. This solution could then be distributed as desired, through one or more take-off ports using any of the fittings described in this disclosure, such mixing chambers are known in the art and need not be shown in detail herein.

Having described the invention in detail, it will be apparent that modifications and changes therein will become apparent to those skilled in the art, such modification being within the spirit and scope of the invention, wherein:

What is claimed is:

1. A watering device for agricultural and horticultural use comprising a tubular conduit having a fluid supply end and a discharge end; removable cap means closing said discharge end; a plurality of self-closing valve members provided at spaced locations along the length of the conduit and at least one insertable and removable fitting including a valve operator comprising the fluid discharge means inserted within said valve and providing external discharge of the fluid carried within said conduit.

2. A watering device as defined in claim 1 wherein said conduit is elliptical in cross-sectional configuration.

3. A watering device as defined in claim 1 wherein said fitting comprises a hollow tube having said valve operator at one end.

4. A watering device as defined in claim 1 wherein said fitting comprises a hollow tube having said valve operator at one end and a pointed soil penetrating outlet at its opposite end and handle means mounted on the tube to facilitate insertion and removal of the fitting into and out of the soil.

5. A watering device as defined in claim 1 wherein said fitting comprising a hollow tube having one end in the form of a perforated hook-like end being adapted for permanent placement in the soil.

6. A watering device as defined in claim 1 wherein said fitting compriess a hollow tube having one end in the form of a spray head and its opposite end defining said valve operator.

7. A watering device for horticultural and agricultural use comprising a plurality of tubular conduits in end to end intercommunicating connection, the first of said conduits being connected at one end to a water supply, the last of said conduits terminating in a closed end and a plurality of self-closing valves spaced along each of said conduits, fitting means including valve operator means inserted in at least some of said valves to provide external fluid flow from said conduits, some of said fittings providing for surface watering of the ground, others of said fittings providing for sub-surface watering of the ground according to the pattern of use intended for said conduits.

8. A watering device as defined in claim 7 wherein said conduits are of elliptical cross-sectional configuration and some of said fittings are disposed in an upward direction and some are disposed facing in a downward direction.

9. A watering device comprising a conduit having conventional threaded male and female coupling members at its respective ends and a body of elliptical cross-sectional configuration; a plurality of self-closing valve means provided in said body normal to the major axis of the ellipse defined by the cross-sectional configuration thereof; a fluid discharge fitting provided in at least one of said valves, said fitting including a hollow tubular valve operator at one end for insertion into and removal from said self-closing valve.

10. A watering device as defined in claim 9 wherein said fitting includes a spray head defining the opposite end to that forming the valve operator.

11. A watering device as defined in claim 9 wherein said fitting includes a sub-soil discharge means at its opposite end to that forming the valve operator and handle means permitting insertion and removal of the sub-soil discharge means into and out of the soil carried by said fitting.

12. A watering device as defined in claim 9 wherein said fitting includes a perforated flexible end disposed opposite to that end defining the valve operator, said flexible end being disposed permanently in the soil.

References Cited

UNITED STATES PATENTS

| | | | |
|---|---|---|---|
| 1,675,184 | 6/1928 | Loepsinger | 239—266 X |
| 1,951,565 | 3/1934 | Sonnett | 137—223 X |
| 2,628,865 | 2/1953 | Duncan | 239—547 X |
| 3,289,418 | 12/1966 | Edgerton | 61—13 |

M. HENSON WOOD, JR., *Primary Examiner.*

M. MAR, *Examiner.*